(12) United States Patent
Bonucci

(10) Patent No.: US 11,066,856 B2
(45) Date of Patent: Jul. 20, 2021

(54) SEALED TAILGATE HANDLE ASSEMBLY

(71) Applicant: TYCO ELECTRONICS BRASIL LTDA., Braganca Paulista (BR)

(72) Inventor: Gustavo Bonucci, Braganca Paulista (BR)

(73) Assignee: Tyco Electronics Brasil LTDA

( * ) Notice: Subject to any disclaimer, the term of this patent is extended or adjusted under 35 U.S.C. 154(b) by 612 days.

(21) Appl. No.: 15/988,061

(22) Filed: May 24, 2018

(65) Prior Publication Data

US 2019/0360243 A1 Nov. 28, 2019

(51) Int. Cl.

| | |
|---|---|
| *H01H 13/14* | (2006.01) |
| *E05B 85/10* | (2014.01) |
| *E05B 81/06* | (2014.01) |
| *H01H 13/00* | (2006.01) |
| *H01H 13/04* | (2006.01) |
| *H01H 13/52* | (2006.01) |
| *H01H 13/26* | (2006.01) |

(Continued)

(52) U.S. Cl.
CPC ............ *E05B 85/107* (2013.01); *E05B 81/06* (2013.01); *E05B 85/103* (2013.01); *H01H 13/00* (2013.01); *H01H 13/04* (2013.01); *H01H 13/14* (2013.01); *H01H 13/26* (2013.01); *H01H 13/52* (2013.01); *B60J 5/107* (2013.01); *E05B 81/76* (2013.01); *H01H 13/10* (2013.01); *H01H 2013/525* (2013.01)

(58) Field of Classification Search
CPC .... H01H 13/14; H01H 13/83; H01H 13/7065; H01H 13/704; H01H 13/86; H01H 13/705; H01H 13/04; H01H 13/702; H01H 13/10; H01H 13/20; H01H 13/50; H01H 13/06; H01H 2223/002; H01H 9/04; H01H 2009/048; H01H 13/063; H01H 21/08; H01H 13/12; E05B 85/107; E05B 81/06; E05B 85/103; E05B 81/76; E05B 77/34; E05B 83/18; B60J 5/107
See application file for complete search history.

(56) References Cited

U.S. PATENT DOCUMENTS

| | | | |
|---|---|---|---|
| 5,295,374 | A | 3/1994 | Bender et al. |
| 9,366,061 | B2 | 6/2016 | Kwon |
| 2006/0279095 | A1 | 12/2006 | Ishiguro |

FOREIGN PATENT DOCUMENTS

| | | |
|---|---|---|
| FR | 3024485 A1 | 2/2016 |
| WO | 2004057135 A2 | 7/2004 |

OTHER PUBLICATIONS

International Search Report, International Application No. PCTIB2019/053949, International Filing Date, May 13, 2019.

*Primary Examiner* — Ahmed M Saeed

(57) ABSTRACT

An embodiment is directed to a sealed tailgate handle assembly having a housing and a circuit board positioned in the housing. A switch is positioned in the housing and is configured to complete an electrical circuit path on the circuit board. Resin material encompasses the circuit board, with the resin material configured to seal the connection between the circuit board and the switch. An inner cover is movable between an initial position and a second position. A resilient member extends between the inner cover and the resin material. An outer cover has a deformable upper wall. Upon an application of a force to the upper wall, the inner cover is moved from an initial position to the second position, causing the inner cover to engage the switch, causing the switch to complete an electrical circuit path on the circuit board to release a tailgate.

18 Claims, 6 Drawing Sheets

(51) Int. Cl.
*B60J 5/10* (2006.01)
*E05B 81/76* (2014.01)
*H01H 13/10* (2006.01)

SEALED TAILGATE HANDLE ASSEMBLY

FIELD OF THE INVENTION

The invention relates to a handle assembly of a tailgate. In particular, it relates to a handle assembly which is compact and sealed.

BACKGROUND OF THE INVENTION

Many vehicles sold today are SUVs, pickup trucks or other types of multi-purpose vehicles (MPVs) which include a tailgate at the rear of the vehicle. The tailgate handle assemblies provided on a surface of the tailgates which are exposed to moisture, dirt and other elements which can be harmful to the operation of the tailgate handle assemblies. In addition, tailgate handle assemblies may also be exposed to items, such as chains, which may interact with the tailgate handle assemblies to cause damage to the tailgate handle assemblies.

It would be beneficial to provide a tailgate handle assembly which is compact and sealed to prevent the elements and other items from causing the failure of the tailgate handle assemblies.

SUMMARY OF THE INVENTION

An embodiment is directed to a sealed tailgate handle assembly having a housing and a circuit board positioned in the housing. A switch is positioned in the housing and is configured to complete an electrical circuit path on the circuit board. Resin material encompasses the circuit board, with the resin material configured to seal the connection between the circuit board and the switch. An inner cover is movable between an initial position and a second position. A resilient member extends between the inner cover and the resin material. An outer cover has a deformable upper wall. Upon an application of a force to the upper wall, the inner cover is moved from an initial position to the second position, causing the inner cover to engage the switch, causing the switch to complete an electrical circuit path on the circuit board to release a tailgate.

An embodiment is directed to a sealed tailgate handle assembly having a housing with a circuit board positioned therein. An electromechanical switch is positioned in the housing. The electromechanical switch is configured to complete an electrical circuit path on the circuit board. Resin material encompasses the circuit board. The resin material is configured to seal the connection between the circuit board and the electromechanical switch. An inner cover is movable between an initial position and a second position. A spring extends between the inner cover and the resin material. The inner cover has a switch receiving recess configured to receive the electromechanical switch and the spring therein. Spring receiving recesses extend from the switch receiving recess and are dimensioned to receive and retain the spring in proper position relative to the inner cover. An outer cover has a deformable upper wall. The outer cover has housing retaining slots provided in housing retaining members. The outer cover is made from material which is waterproof and which is not rigid, allowing the housing retaining members and the retaining slots to be mounted on and conform to an upper surface of the housing to provide a seal between the outer cover and the housing. Upon an application of a force to the upper wall, the inner cover is moved from an initial position to the second position, causing the inner cover to engage the electromechanical switch, causing the electromechanical switch to complete an electrical circuit path on the circuit board to release a tailgate.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
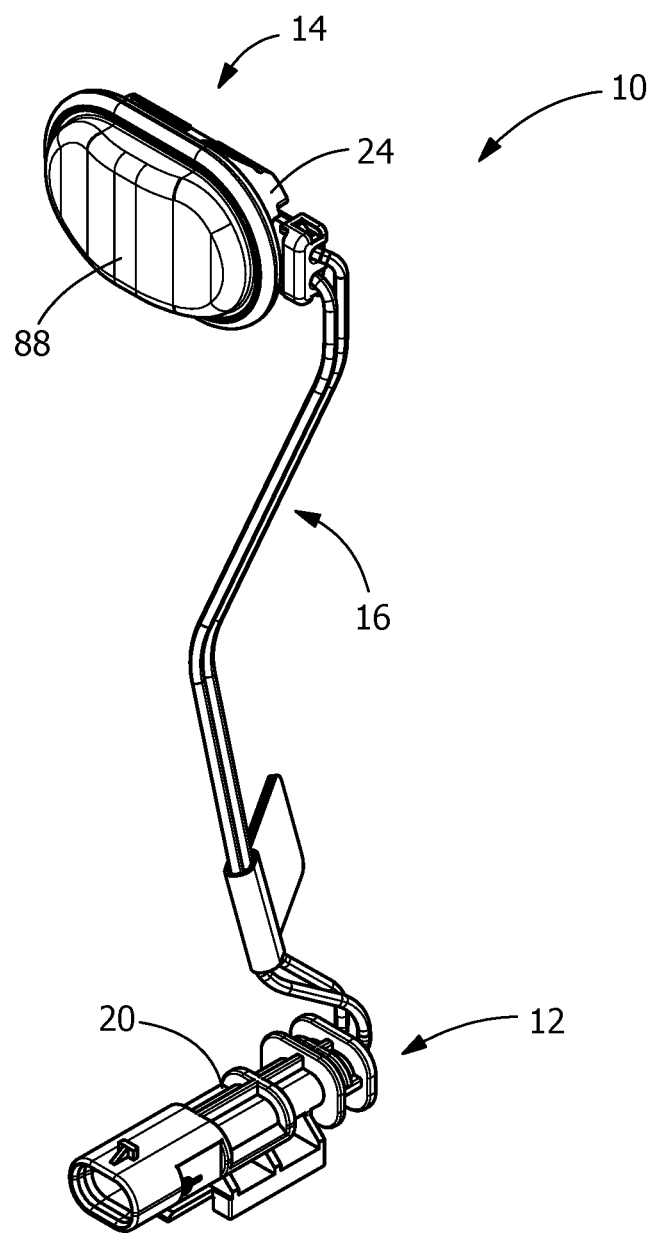
FIG. 1 is a perspective view of an illustrative view of a tailgate release assembly with an illustrative sealed tailgate handle of the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Figure 2:
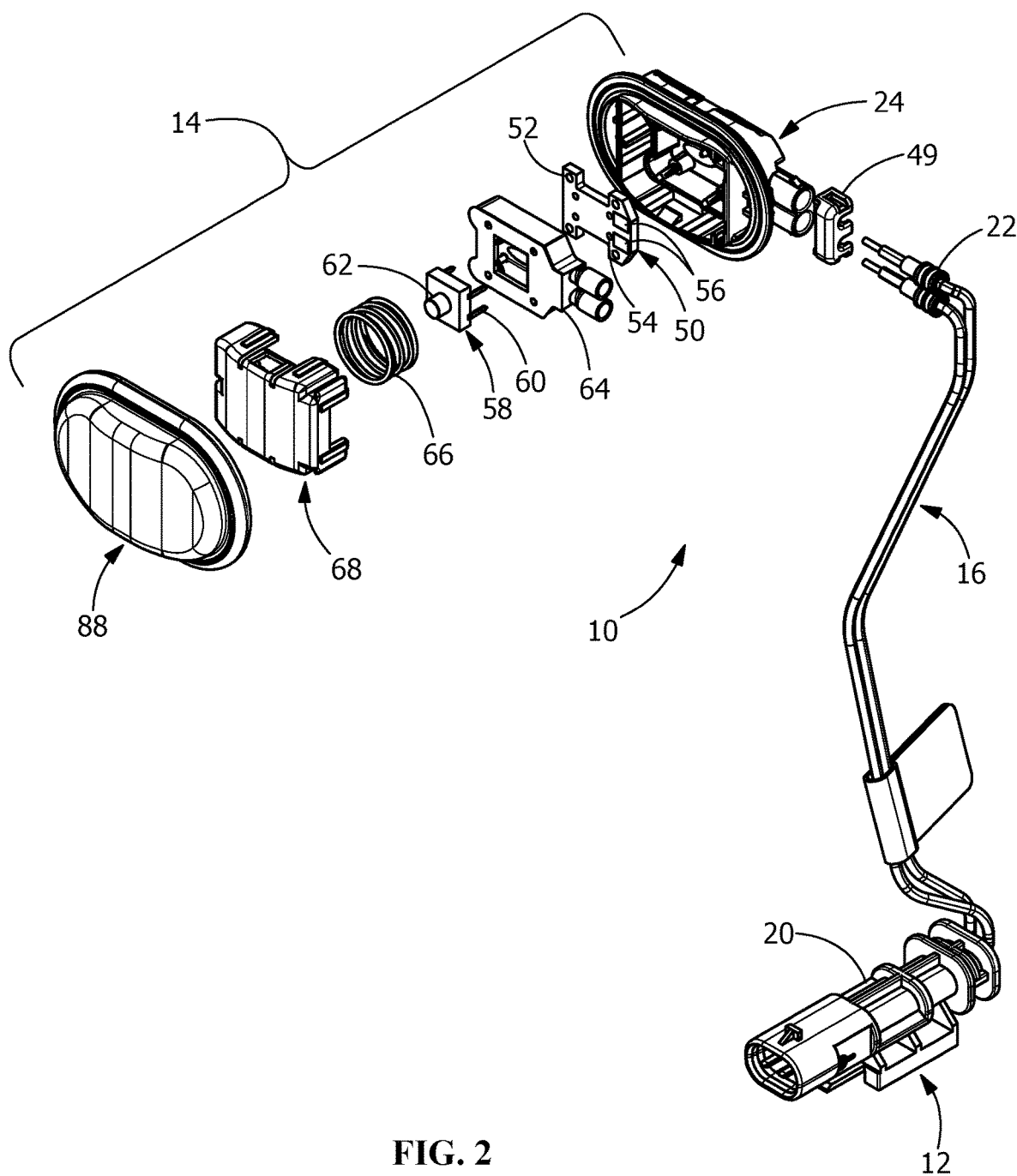
FIG. 2 is an exploded perspective view of the tailgate release assembly and the sealed tailgate handle of FIG. 1.

As best shown in FIGS. 1 and 2, a tailgate release assembly 10 is shown. The tailgate release assembly 10 has a connector tab assembly 12 and a sealed tailgate handle assembly 14. A cable 16 extends between, and electrical interconnects, the connector tab assembly 12 and the sealed tailgate handle assembly 14. Terminals (not shown) are provided at a first end of the cable 16. The terminals are positioned in a housing 20 of the connector tab assembly. Seals 22 are provided at a second end of the cable 16 which has exposed conductors extending therefrom. The seals 22 and the exposed conductors are positioned in a housing 24 of the sealed tailgate handle assembly 14.

Figure 3:
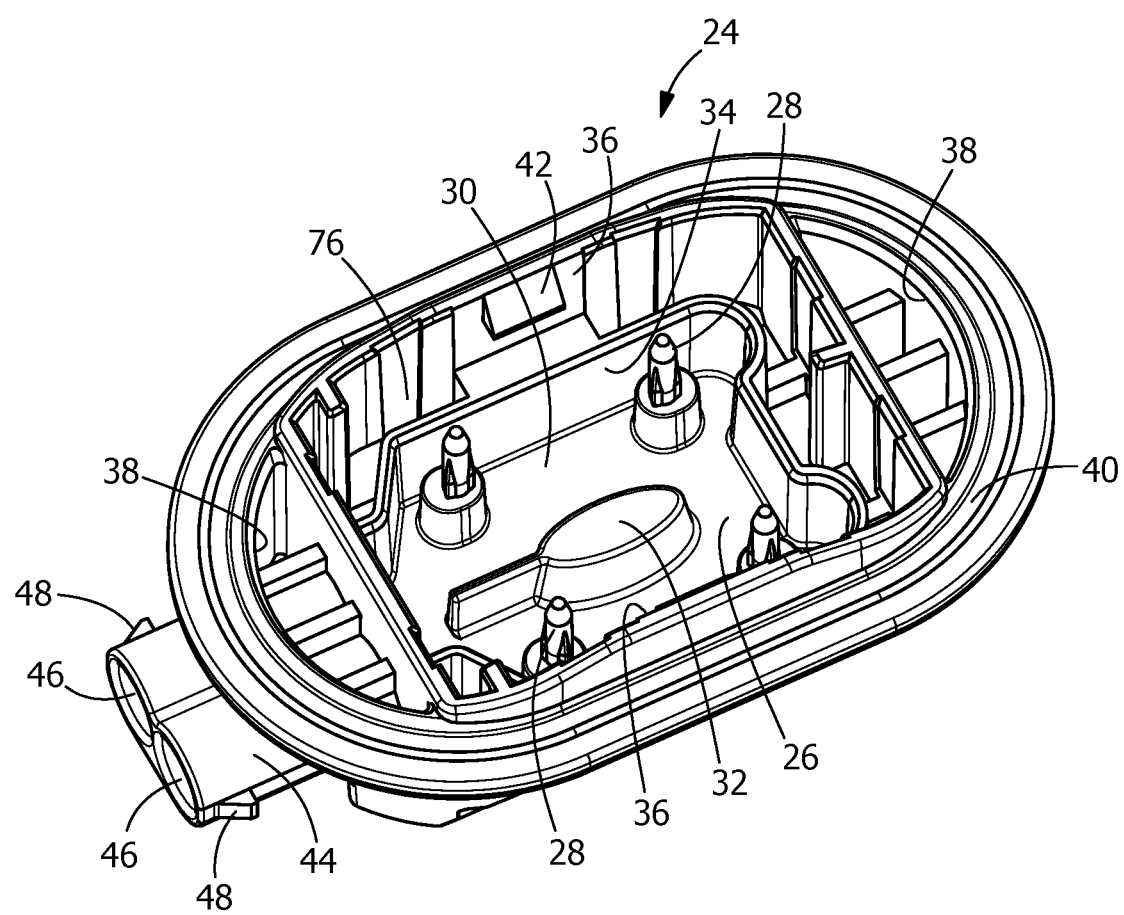
FIG. 3 is a perspective view of an illustrative housing of the sealed tailgate handle.

As best shown in FIG. 3, the sealed tailgate handle assembly 14 has a housing 24 with a circuit board receiving area 26. Circuit board receiving posts 28 are positioned in the circuit board receiving area 26 and extend from a bottom wall 30 of the housing 24. A circuit board support 32 is positioned proximate the center of the circuit board receiving area 26. The circuit board support 32 extends from the bottom wall 30 of the housing 24. An interior wall 34 extends proximate the periphery of the circuit board receiving area 26.

Sidewalls 36 and end walls 38 extend from the bottom wall 30 to an upper surface 40 of the housing 24. In the illustrative embodiment shown, the sidewalls 36 are essentially parallel to each other, and the end walls 38 have arcuate configurations. Cover latching projections 42 extend from the sidewalls 36.

Terminal receiving projections 44 extend from a respective end wall 24. The terminal receiving projections 44 have terminal receiving openings 46 which extend through the terminal receiving projections 44 and through the respective end wall 38 of the housing 24 to allow the second terminals to be positioned therein. Retainer latching projections 48 are provided on the terminal receiving projections 44. A seal retainer 49 cooperates with the retainer latching projections 48 to retain the seal retainer 49 in position. The seal retainer 49 retains the cable 16 and seal 22 is position, as shown in FIG. 4.

Figure 4:
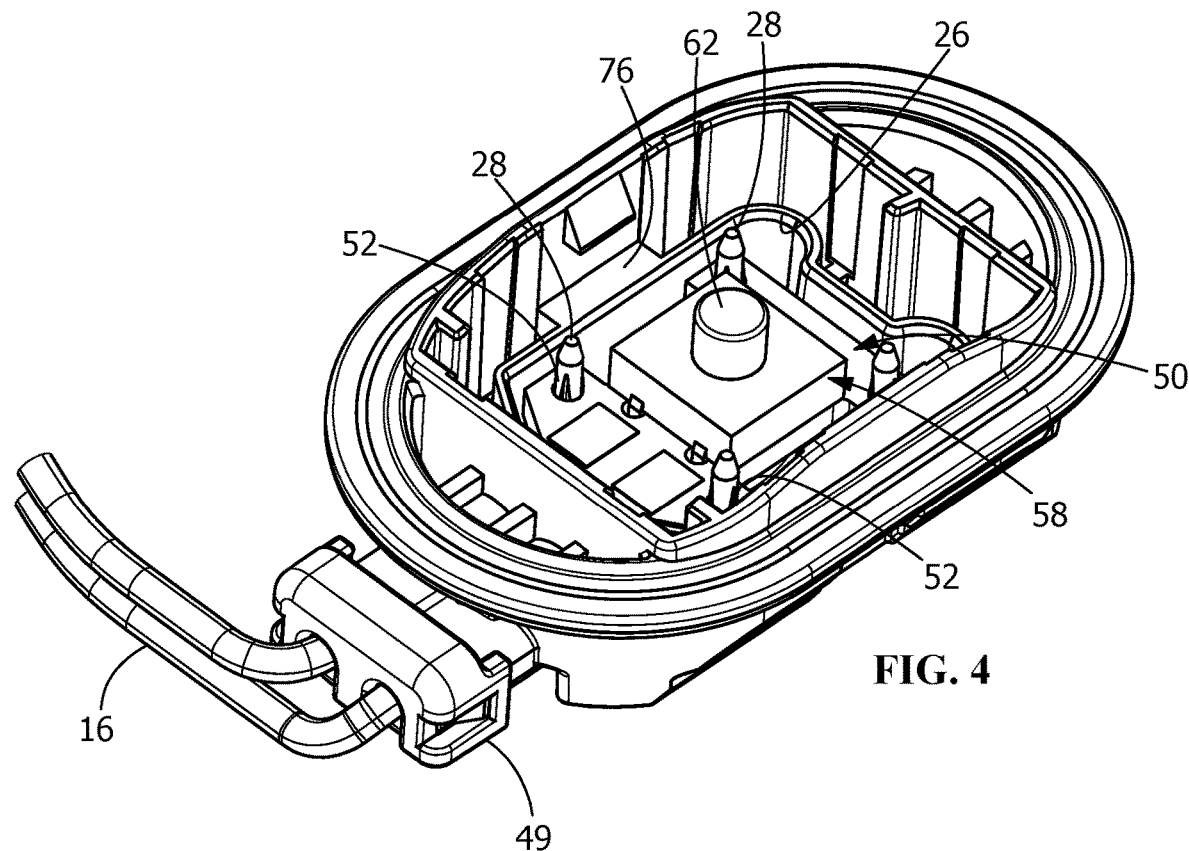
FIG. 4 is a perspective view of the housing of FIG. 3 with a circuit board and tactile electromechanical switch provided therein.

As shown in FIG. 4, a circuit board 50 is positioned in the circuit board receiving area 26. The circuit board 50 has openings 52 positioned proximate the perimeter thereof. The openings 52 cooperate with the circuit board receiving posts 28 to position the circuit board 50 in the circuit board receiving area 26. A bottom surface of the circuit board 50 is positioned in engagement with the circuit board support 32 to properly position the circuit board in the circuit board receiving area 26. As shown in FIG. 2, the circuit board 50 has plated through holes 54 and pads 56 provided thereon.

A tactile electromechanical switch 58 is provided in electrical and mechanical engagement with the circuit board 50. Mounting legs 60 extend from switch 58. The mounting legs 60 are configured to be inserted into and make electrical connections with through holes 54 of the circuit board 50. An activation button 62 extends from the tactile electromechanical switch 58 in a direction away from the circuit board 50.

During assembly of the sealed tailgate handle assembly 14, the exposed ends of the second ends of the cable 16 are positioned through the terminal receiving openings 46 such that the exposed ends of the second ends are placed in electrical engagement with the pads 56 of the circuit board 50. The exposed ends of the second ends of the cable 16 are soldered or welded to the pads 56 to maintain the exposed ends of the second ends of the cable 16 in electrical engagement with the pads 56. The seals 22 cooperate with the terminal receiving projections 44 to provide a seal therebetween.

With the exposed ends of the second ends of the cable 50, the circuit board 50 and the tactile electromechanical switch 58 properly positioned in the housing 24, a resin material 64 is placed in the circuit board receiving area 26. The resin material 64 encompasses the circuit board 50, sealing the connection between the exposed ends of the second ends of the cable 16 and the circuit board 50 and sealing the connection between the circuit board 50 and the tactile electromechanical switch 58.

A resilient member or spring 66 is positioned around the periphery of the tactile electromechanical switch 58. The spring 66 rests on the resin material 64.

Figure 5:
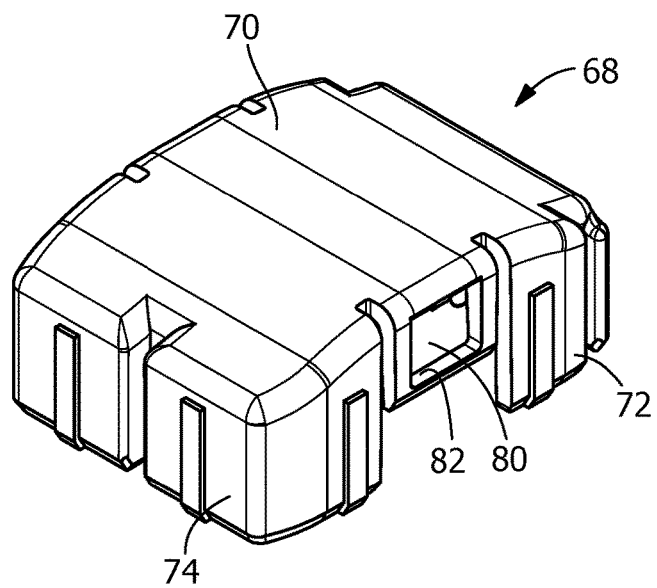
FIG. 5 is a perspective view of an illustrative intermediate cover of the sealed tailgate handle.

As best shown in FIG. 5, an inner cover 68 has a curved or non-linear upper wall 70. Sidewalls 72 and end walls 74 extend from the upper wall 70. The sidewalls 72 and the end walls 74 are essentially perpendicular to the upper wall 70. The sidewalls 72 are positioned in slots 76 between the interior wall 34 of the circuit board receiving area 26 and the sidewalls 36 of the housing 24. Similarly, the end walls 74 are also retained in slots 78 in the housing 24. The sidewalls 72, the end walls 74 and the slots 76, 78 are dimensioned to allow the sidewalls 72, the end walls 74 and the inner cover 68 to move relative to the housing 24, the circuit board 50 and the tactile electromechanical switch 58 in a direction which is essentially perpendicular to the bottom wall 30 of the housing 24.

Latch receiving openings 80 are provided on the sidewalls 72 of the inner cover 68. The latch receiving openings 80 have latch engaging surfaces 82 which are configured to engage the cover latching projections 42. The latch receiving openings 80 are configured to receive the cover latching projections 42 therein.

The inner cover 68 has a switch receiving recess 84 provided between the sidewalls 72 and the end walls 74 which is dimensioned to receive the tactile electromechanical switch 58 and the spring 66 therein. Spring receiving recesses 86 extend from the switch receiving recess 84 and are dimensioned to receive and retain spring 66 in proper position relative to the inner cover 68.

Figure 6:
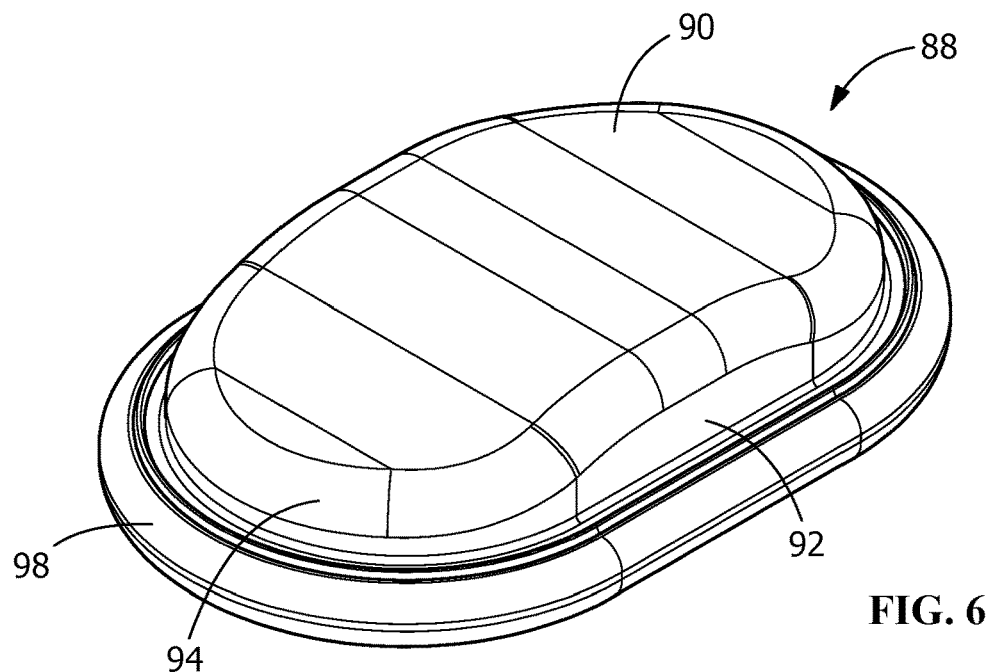
FIG. 6 is a perspective view of an illustrative outer cover of the sealed tailgate handle.
Figure 7:
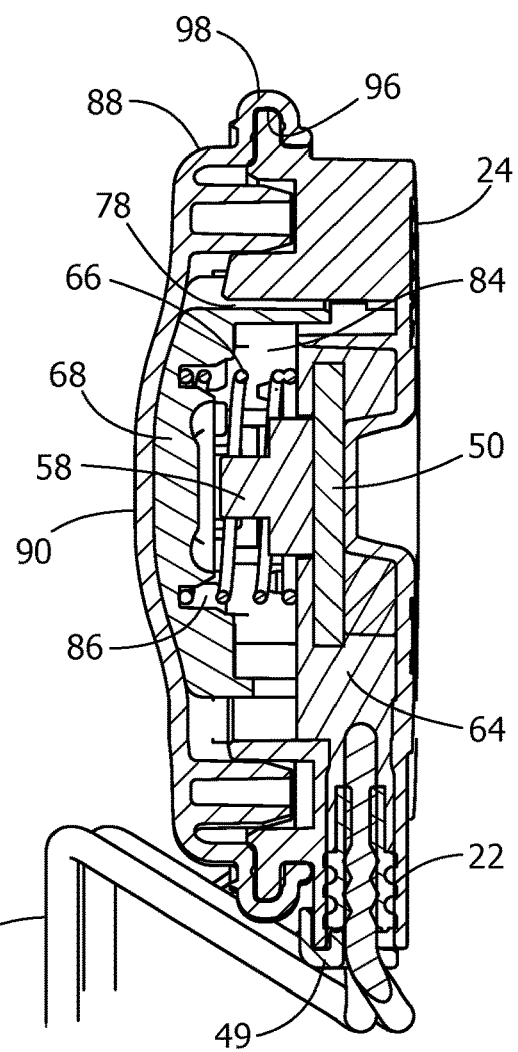
FIG. 7 is a cross-sectional view of the sealed tailgate handle of FIG. 1, taken along line 7-7, showing the sealed tailgate handle in an initial or non-compressed position.

Referring to FIGS. 6 and 7, as the inner cover 68 in inserted into the housing 24, the sidewalls 72 are movably positioned in slots 76, and the end walls 74 are movably positioned in the slots 78. The cover latching projections 42 are positioned in the latch receiving openings 80. In the initial or not compressed position, the spring 66 cooperates with the upper wall 70 of the inner cover 68 to bias the cover away from the tactile electromechanical switch 58. However, the cooperate of the cover latching projections 42 with the latch engaging surfaces 82 of the latch receiving openings 80 prevents the removal of the inner cover 68 from the housing 24 and retains the inner cover 68 in the initial or not compressed position.

Figure 8:
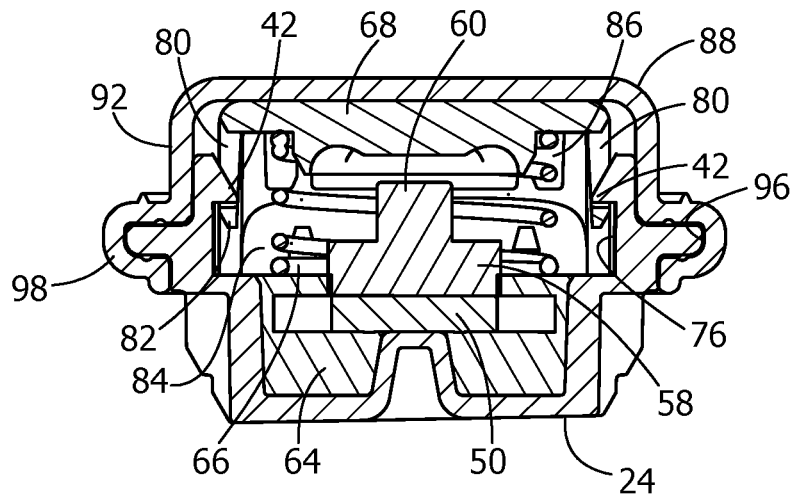
FIG. 8 is a cross-sectional view of the sealed tailgate handle of FIG. 1, taken along line 8-8, showing the sealed tailgate handle in the initial or non-compressed position.
Figure 9:
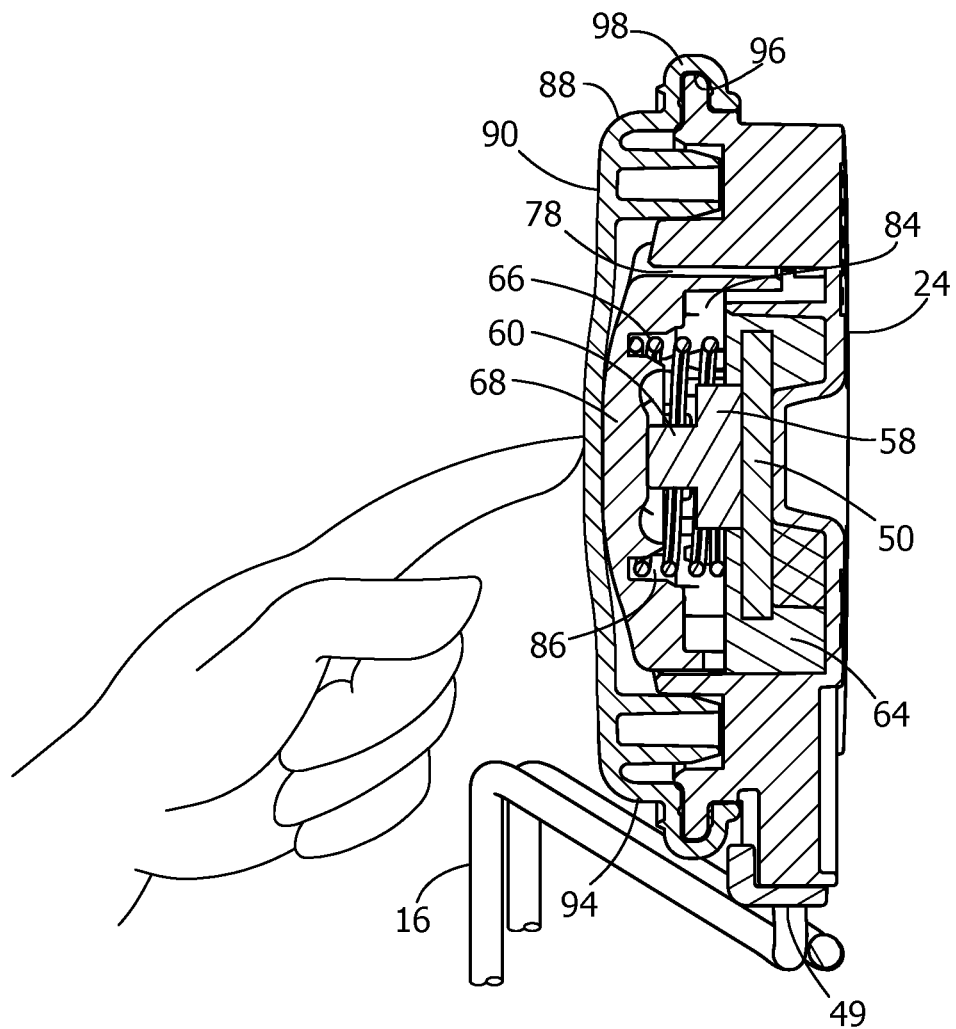
FIG. 9 is a cross-sectional view of the sealed tailgate handle, similar to that of FIG. 7, showing the sealed tailgate handle in second or compressed position.

As best shown in FIG. 6, an outer cover 88 has a deformably curved or non-linear upper wall 90. Sidewalls 92 and end walls 94 extend from the upper wall 90. The sidewalls 92 and the end walls 94 are essentially perpendicular to the upper wall 90. As best shown in FIGS. 7 through 9, the sidewalls 92 and end walls 94 have housing retaining slots 96 provided in housing retaining members 98. The outer cover 88 is made from material which is waterproof and which is not rigid, such as, but not limited to, rubber. The non-rigid flexible material allows the housing retaining members 98 and the retaining slots 96 to be mounted on and conform to the upper surface 40 of the housing 24 to provide a seal between the outer cover 88 and the housing 24, thereby preventing moisture or other contaminants from entering the housing.

As shown in FIGS. 7 and 8, with the outer cover 88 properly inserted onto the housing 24, the outer cover 88 and the inner cover 68 are retained in the initial or not compressed position. Upon an application of a force, as shown in FIG. 9, the upper wall 90 of the outer cover 88 is deformed, causing the inner cover to move from the initial or not compressed position, shown in FIGS. 7 and 8, to the second or compressed position, shown in FIG. 9. As this occurs, the applied force causes the spring 66 to compress, allowing the inner cover 68 to move toward and engage the activation button 62 of the tactile electromechanical switch 58. Continued movement of the outer cover 88 and inner cover 68 toward the bottom wall 30 of the housing 24 causes the tactile electromechanical switch 58 to complete an electrical circuit path on the circuit board 50, allowing the tactile electromechanical switch 58 to send a signal via the circuit board 50 and cable 16 to the tailgate release assembly 12 to release the tailgate.

After the pressure applied to the outer cover 88 is released, the spring returns toward the unstressed position shown in FIG. 7, thereby forcing the inner cover 68 to the initial or not compressed position and moving the inner cover 68 from engagement with the activation button 62 of the tactile electromechanical switch 58.

The present invention, as illustrated in the embodiment shown, provides for a compact sealed tailgate handle which prevents moisture, dirt and other contaminants from entering the sealed tailgate handle, thereby preventing failure of the sealed tailgate handle.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A sealed tailgate handle assembly comprising:
a housing, sidewalls and end walls extending from a bottom wall of the housing to an upper surface of the housing;
a circuit board positioned in the housing;
a switch positioned in the housing, the switch configured to complete an electrical circuit path on the circuit board;
resin material encompassing the circuit board, the resin material configured to seal a connection between the circuit board and the switch;
an inner cover movable between an initial position and a second position;
a resilient member extending between the inner cover and the resin material;
an outer cover having a deformable upper wall;
terminal receiving projections extending from a respective end wall of the end walls of the housing, the terminal receiving projections have terminal receiving openings which extend through the terminal receiving projections and through the respective end wall of the housing to allow terminals to be position therein;
wherein upon an application of a force to the upper wall, the inner cover is moved from an initial position to the second position, causing the inner cover to engage the switch, causing the switch to complete an electrical circuit path on the circuit board to release a tailgate.

2. The sealed tailgate handle assembly as recited in claim 1, wherein the switch has mounting legs which are positioned in and make electrical connections with through holes of the circuit board.

3. The sealed tailgate handle assembly as recited in claim 2, wherein an activation button extends from the switch in a direction away from the circuit board.

4. The sealed tailgate handle assembly as recited in claim 1, wherein the housing has a circuit board receiving area for receiving the circuit board therein, an interior wall extends proximate a periphery of the circuit board receiving area.

5. The sealed tailgate handle assembly as recited in claim 4, wherein circuit board receiving posts are positioned in the circuit board receiving area and extend from a bottom wall of the housing, a circuit board support is positioned proximate the center of the circuit board receiving area, the circuit board support extends from the bottom wall of the housing.

6. The sealed tailgate handle assembly as recited in claim 5, wherein the circuit board is positioned in the circuit board receiving area, the circuit board has openings positioned proximate a perimeter thereof, the openings cooperate with the circuit board receiving posts to position the circuit board in the circuit board receiving area, a bottom surface of the circuit board is positioned in engagement with the circuit board support to properly position the circuit board in the circuit board receiving area.

7. The sealed tailgate handle assembly as recited in claim 1, wherein retainer latching projections are provided on the terminal receiving projections.

8. The sealed tailgate handle assembly as recited in claim 1, wherein the outer cover has a curved or non-linear upper wall, the outer cover has housing retaining slots provided in housing retaining members, the outer cover is made from material which is waterproof and which is not rigid, allowing the housing retaining members and the retaining slots to be mounted on and conform to an upper surface of the housing to provide a seal between the outer cover and the housing.

9. The sealed tailgate handle assembly as recited in claim 1, wherein the outer cover is made from rubber.

10. A sealed tailgate handle assembly comprising:
a housing;
a circuit board positioned in the housing;
a switch positioned in the housing, the switch configured to complete an electrical circuit path on the circuit board;
resin material encompassing the circuit board, the resin material configured to seal a connection between the circuit board and the switch;
an inner cover movable between an initial position and a second position;
a resilient member extending between the inner cover and the resin material;

an outer cover having a deformable upper wall;
wherein upon an application of a force to the upper wall, the inner cover is moved from an initial position to the second position, causing the inner cover to engage the switch, causing the switch to complete an electrical circuit path on the circuit board to release a tailgate;
the housing has a circuit board receiving area for receiving the circuit board therein, an interior wall extends proximate a periphery of the circuit board receiving area;
the inner cover has a curved or non-linear upper wall, sidewalls and end walls extending from the upper wall, the sidewalls and the end walls are positioned in slots proximate the interior wall of the circuit board receiving area.

11. The sealed tailgate handle assembly as recited in claim 10, wherein latch receiving openings are provided on the sidewalls of the inner cover, the latch receiving openings have latch engaging surfaces, the latch receiving openings are configured to receive cover latching projections which extend from the sidewalls of the housing.

12. The sealed tailgate handle assembly as recited in claim 11, wherein the inner cover has a switch receiving recess provided between the sidewalls of the inner cover and the end walls of the inner cover, the switch receiving recess is dimensioned to receive the switch and a spring therein, spring receiving recesses extend from the switch receiving recess and are dimensioned to receive and retain the spring in proper position relative to the inner cover.

13. A sealed tailgate handle assembly comprising:
a housing;
a circuit board positioned in the housing;
an electromechanical switch positioned in the housing, the electromechanical switch configured to complete an electrical circuit path on the circuit board;
resin material encompassing the circuit board, the resin material configured to seal a connection between the circuit board and the electromechanical switch;
an inner cover movable between an initial position and a second position;
a spring extending between the inner cover and the resin material;
the inner cover having a switch receiving recess configured to receive the electromechanical switch and the spring therein, spring receiving recesses extend from the switch receiving recess and are dimensioned to receive and retain the spring in proper position relative to the inner cover;
an outer cover, the outer cover having deformable upper wall, the outer cover has housing retaining slots provided in housing retaining members, the outer cover is made from material which is waterproof and which is not rigid, allowing the housing retaining members and the retaining slots to be mounted on and conform to an upper surface of the housing to provide a seal between the outer cover and the housing;
wherein upon an application of a force to the upper wall, the inner cover is moved from an initial position to the second position, causing the inner cover to engage the electromechanical switch, causing the electromechanical switch to complete an electrical circuit path on the circuit board to release a tailgate.

14. The sealed tailgate handle assembly as recited in claim 13, wherein the electromechanical switch has mounting legs which are positioned in and make electrical connections with through holes of the circuit board, an activation button extends from the electromechanical switch in a direction away from the circuit board.

15. The sealed tailgate handle assembly as recited in claim 13, wherein the housing has a circuit board receiving area for receiving the circuit board therein, an interior wall extends proximate a periphery of the circuit board receiving area, circuit board receiving posts are positioned in the circuit board receiving area and extend from a bottom wall of the housing, a circuit board support is positioned proximate the center of the circuit board receiving area, the circuit board support extends from the bottom wall of the housing.

16. The sealed tailgate handle assembly as recited in claim 13, wherein sidewalls and end walls extend from a bottom wall of the housing to an upper surface of the housing, cover latching projections extend from the sidewalls, terminal receiving projections extend from a respective end wall of the end walls of the housing, the terminal receiving projections have terminal receiving openings which extend through the terminal receiving projections and through the respective end wall of the housing to allow terminals to be positioned therein, retainer latching projections are provided on the terminal receiving projections.

17. The sealed tailgate handle assembly as recited in claim 13, wherein the inner cover has a curved or non-linear upper wall, sidewalls and end walls extending from the upper wall, the sidewalls and the end walls are positioned in slots proximate the interior wall of the circuit board receiving area.

18. The sealed tailgate handle assembly as recited in claim 17, wherein latch receiving openings are provided on the sidewalls of the inner cover, the latch receiving openings have latch engaging surfaces, the latch receiving openings are configured to receive cover latching projections which extend from the sidewalls of the housing.

* * * * *